United States Patent [19]

Lambert et al.

[11] Patent Number: 5,701,134
[45] Date of Patent: Dec. 23, 1997

[54] PICTURE DISPLAY DEVICE WITH UNIFORMITY CORRECTION OF ELECTRON SUPPLY

[75] Inventors: Nicolaas Lambert; Gerardus G. P. Van Gorkom, both of Eindhoven, Netherlands

[73] Assignee: U.S. Philips Corporation, New York, N.Y.

[21] Appl. No.: 387,739

[22] PCT Filed: Jun. 23, 1994

[86] PCT No.: PCT/IB94/00171

§ 371 Date: Feb. 16, 1995

§ 102(e) Date: Feb. 16, 1995

[87] PCT Pub. No.: WO95/01705

PCT Pub. Date: Jan. 12, 1995

Related U.S. Application Data

[63] Continuation-in-part of Ser. No. 249,417, May 26, 1994, and Ser. No. 373,917, Jan. 17, 1995, Pat. No. 5,525,873, which is a continuation of Ser. No. 287,052, Aug. 8, 1994, which is a continuation of Ser. No. 990,780, Dec. 9, 1992, which is a continuation-in-part of Ser. No. 830,951, Feb. 6, 1992, Pat. No. 5,313,136, which is a continuation of Ser. No. 528,677, May 24, 1990, and a continuation-in-part of Ser. No. 53,980, Apr. 26, 1993, Pat. No. 5,347,199, which is a continuation of Ser. No. 954,949, Sep. 30, 1992, which is a continuation of Ser. No. 637,039, Jan. 3, 1991, which is a continuation-in-part of Ser. No. 528,677, May 24, 1990.

[30] Foreign Application Priority Data

Jul. 1, 1993 [BE] Belgium .................. 09300681

[51] Int. Cl.⁶ .................. H04N 9/12
[52] U.S. Cl. .................. 345/74; 313/497
[58] Field of Search .................. 313/422, 371, 313/105, 497; 315/366, 169.3, 169.1; 345/74; 348/807, 717, 262

[56] References Cited

U.S. PATENT DOCUMENTS

| | | | |
|---|---|---|---|
| 4,030,090 | 6/1977 | Endriz | 345/74 X |
| 4,077,054 | 2/1978 | Endriz | 345/74 X |
| 4,121,137 | 10/1978 | Credelle | 315/366 |
| 4,464,611 | 8/1984 | Hasili | 315/366 |
| 4,694,225 | 9/1987 | Tomii et al. | 315/366 |
| 4,859,912 | 8/1989 | Lippmann et al. | 315/169.3 |
| 4,973,889 | 11/1990 | Tomii et al. | 315/366 |
| 5,061,880 | 10/1991 | Hashiguchi et al. | 315/366 |
| 5,068,579 | 11/1991 | Tomii et al. | 315/366 |
| 5,202,609 | 4/1993 | Tomii et al. | 313/497 |
| 5,313,136 | 5/1994 | Van Gorkom et al. | 313/422 |
| 5,347,199 | 9/1994 | Van Gorkom et al. | 315/169.1 |
| 5,386,175 | 1/1995 | Van Gorkom et al. | 313/422 |
| 5,442,253 | 8/1995 | Van Gorkom et al. | 313/422 |
| 5,489,815 | 2/1996 | Van Gorkom et al. | 313/442 |
| 5,497,046 | 3/1996 | Van Gorkom et al. | 313/422 |

FOREIGN PATENT DOCUMENTS

| | | | |
|---|---|---|---|
| 0400750 | 12/1990 | European Pat. Off. | H01J 31/12 |
| 0436997 | 7/1991 | European Pat. Off. | H01J 31/12 |

*Primary Examiner*—Mark R. Powell
*Assistant Examiner*—John Suraci
*Attorney, Agent, or Firm*—Robert J. Kraus

[57] ABSTRACT

A picture display device (W) includes a display unit (1) having a vacuum envelope which is provided with a transparent face plate (3), having a luminescent screen, and a rear plate (4). The display unit has a plurality of juxtaposed sources (5) for emitting electrons, a plurality of electron transport ducts (6, 6', 6") cooperating with the sources for transporting the electrons in the form of electron currents, and selection means (611) for withdrawing each electron current at predetermined locations from its transport duct and for directing the withdrawn current toward desired pixels of the luminescent screen. In order to direct the correct quantity of electrons into the electron transport ducts for relevant video information, the voltages applied to the grids are modulated with a video signal and a uniformity correction signal. One of these signals controls a pulse-duration and the other signal controls a pulse-height of the drive signals.

10 Claims, 4 Drawing Sheets

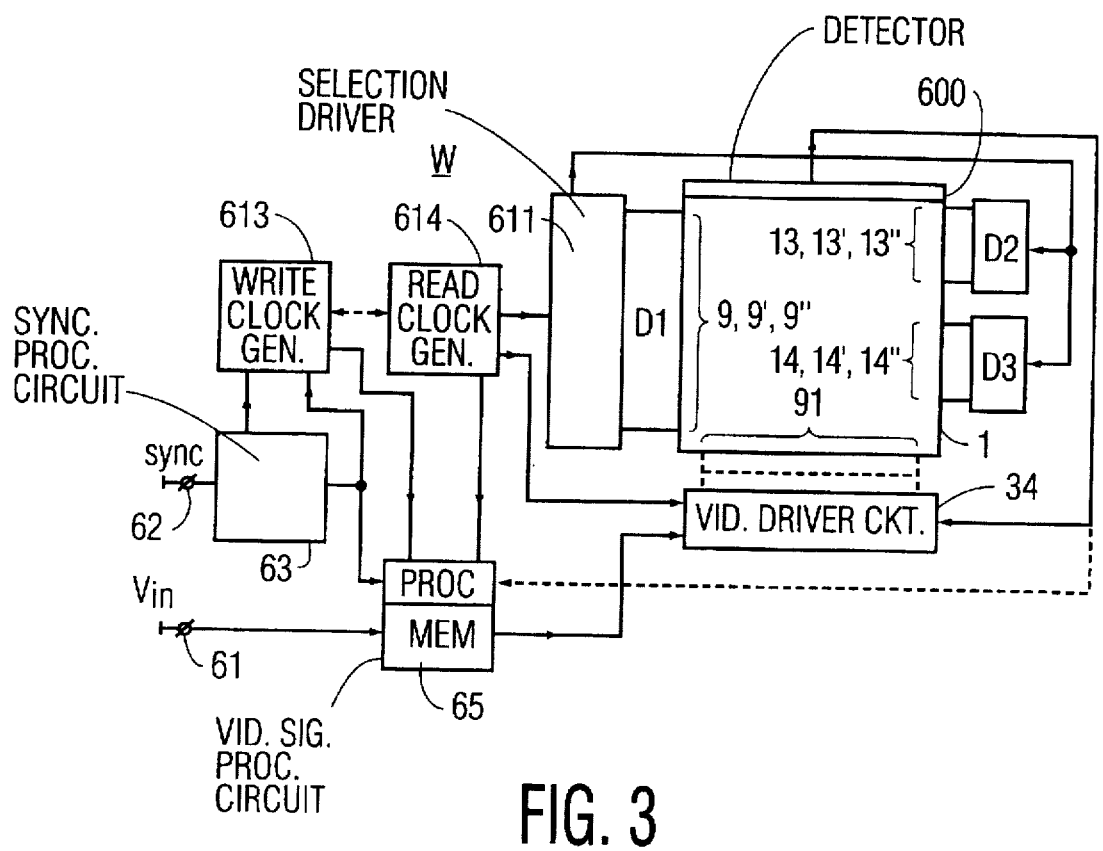
FIG. 3
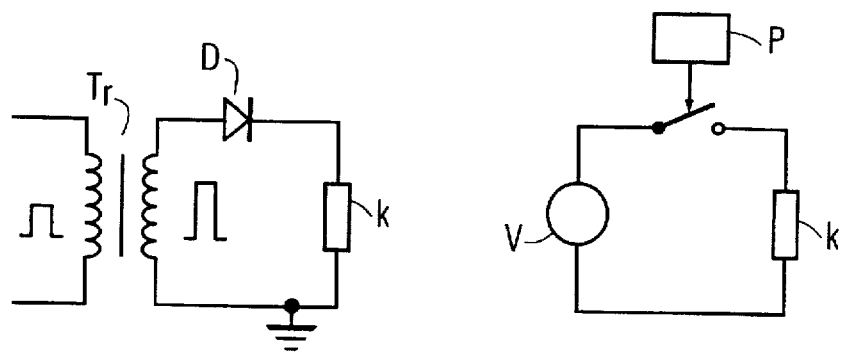
FIG. 4A
FIG. 4B

PICTURE DISPLAY DEVICE WITH UNIFORMITY CORRECTION OF ELECTRON SUPPLY

CROSS REFERENCE TO RELATED APPLICATIONS

This application is a continuation-in-part of U.S. patent application Ser. No. 08/373,917 filed on 17 Jan. 1995 (PHN 13963B) now U.S. Pat. No. 5,525,873, which is a continuation of U.S. patent application Ser. No. 08/287,052 filed on 8 Aug. 1994 (PHN 13963A) which is a continuation of U.S. patent application Ser. No. 07/990,780 filed on 9 Dec. 1992 (PHN 13963), which is a continuation-in-part of U.S. patent application Ser. No. 07/830,951 filed on 6 Feb. 1992 (now U.S. Pat. No. 5,313,136), which is a continuation of U.S. patent application Ser. No. 07/528,677 filed on 24 May 1990 (PHN 12927); and a continuation-in-part of U.S. patent application Ser. No. 08/053,980 filed on 26 Apr. 1993 (now U.S. Pat. No. 5,347,199), which is a continuation of U.S. patent application Ser. No. 07/954,949 filed on 30 Sep. 1992 (PHN 13197), which is a continuation of U.S. patent application Ser. No. 07/637,039 filed on 3 Jan. 1991, which is a continuation-in-part of U.S. patent application Ser. No. 07/528,677 filed on 24 May 1990. This application is also a continuation-in-part of copending U.S. patent application Ser. No. 08/249,417 filed on 26 May 1994.

BACKGROUND OF THE INVENTION

The invention relates to a picture display device comprising a video drive circuit and a display unit having a vacuum envelope which is provided with a transparent face plate with a luminescent screen and a rear plate, said display unit comprising a plurality of juxtaposed sources for emitting electrons, a plurality of electron transport ducts cooperating with the sources for transporting the electrons in the form of electron currents, and selection means for withdrawing each electron current at predetermined locations from its transport duct and for directing said current towards desired pixels of the luminescent screen.

A picture display device of this type is described in the non prepublished European Patent Application no. 92204007.6 (PHN 13.963), with reference to publication number EP 0550104A2.

The display unit mentioned above is of the flat-panel type, as disclosed, for example in European Patent Applications EP-A-400 750 and EP-A-436 997. Display units of the flat-panel type are constructions having a transparent face plate and, arranged at a small distance therefrom, a rear plate, which plates are interconnected by means of partitions and in which the inner side of the face plate is provided with pixels in the form of a phosphor pattern, one side of which is provided with an electrically conducting coating (the combination also being referred to as luminescent screen). If (video information-controlled) electrons impinge upon the luminescent screen, a visual image is formed which is visible via the front side of the face plate. The face plate may be flat or, if desired, curved (for example, spherical or cylindrical).

The display unit described in European Patent Applications EP-A-400 750 and EP-A-436 997 comprises a plurality of juxtaposed sources for emitting electrons, local electron transport ducts cooperating with the sources and each having walls of high-ohmic, electrically substantially insulating material having a secondary emission coefficient suitable for transporting emitted electrons in the form of electron currents and a selection structure comprising selectively energizable electrodes (selection electrodes) for withdrawing each electron current from its transport duct at predetermined extraction locations facing the luminescent screen, while further means are provided for directing extracted electrons towards pixels of the luminescent screen for producing a picture composed of pixels.

The operation of this known display unit is based on the recognition that electron transport is possible when electrons impinge on an inner wall of an elongate evacuated cavity (referred to as "compartment") defined by walls of a high-ohmic, electrically substantially insulating material (for example, glass or synthetic material), if an electric field of sufficient power is generated in the longitudinal direction of the "compartment" (by applying an electric potential difference across the ends of the "compartment"). The impinging electrons then generate secondary electrons by wall interaction,. which electrons are attracted to a further wall section and in their turn generate secondary electrons again by wall interaction. The circumstances (field strength E, electrical resistance of the wall, secondary emission coefficient $\delta$ of the walls) may be chosen to be such that a substantially constant vacuum current will flow in the "compartment".

Starting from the above-mentioned principle, a flat-panel picture display unit can be realised by providing each one of a plurality of juxtaposed "compartments", which constitute transport ducts, with a column of extraction apertures at a side which is to face a display screen. It will then be practical to arrange the extraction apertures of adjacent transport ducts along parallel lines extending transversely to the transport ducts. By associating selection electrodes arranged in rows with the arrangement of apertures, which selection electrodes are energizable by means of a first (positive) electric voltage (pulse) for withdrawing electron currents from the "compartments" via the apertures of a row, or which are energizable by means of a second (lower) electric voltage if no electrons are to be locally withdrawn from the "compartments", an addressing means is provided with which electrons withdrawn from the "compartments" can be directed towards the screen for producing an image composed of pixels by activating the pixels.

If non-uniformities occurred from column to column when controlling the compartments, the displayed image could give a stripe-like impression.

SUMMARY OF THE INVENTION

It is, inter alia, an object of the invention to obviate the above-mentioned drawback. In accordance with one aspect of the invention, the invention provides a picture display device comprising a video drive circuit for generating drive signals for driving a display unit, said display unit comprising a plurality of juxtaposed sources for emitting electrons, and a plurality of electron transport ducts cooperating with the sources for transporting the electrons, wherein the video drive circuit comprises a modulation circuit adapted to carry out at least a pulse-duration modulation of the drive signals in dependence upon first and second modulation signals, for controlling the supply of electrons from the sources to the electron transport ducts, and wherein said modulation signals are an applied video signal and a uniformity correction signal.

By modulating the drive signals with the applied video signal, any luminance can be obtained so that the whole spectrum can be displayed on the display screen. By modulating the drive signals with the uniformity correction signal, the non-uniformity can be corrected, and by using pulse-duration modulation of the drive signals, a simple and accurate output stage can be used.

One embodiment of the invention enables a uniformity correction by first multiplying the applied video signal and the uniformity correction signal to obtain a signal to control the pulse-duration of the drive signals. A simple output stage can be used (for instance a switch).

Another embodiment of the invention enables a uniformity correction by modulating for example, the pulse-duration in dependence on the applied video signal and the pulse-height in dependence on the uniformity correction signal. This has the advantage of providing a uniformity correction which is independent of the pulse-duration.

Yet another embodiment of the invention, wherein the modulation circuit is adapted to carry out the pulse-duration modulation of the drive signals by controlling a leading edge, has the advantage that the switching over in the selection system of the picture display device, occurring between the pulses of the drive signal and accompanied by a given settling period, will introduce a (small) error in the high luminance portions of the video signal, and will not affect the sensitive dark portions.

Still another embodiment of the invention, wherein the modulation circuit is adapted to generate at least two different pulse-height levels, each of the levels being pulse-duration modulated, has the advantage that the high frequencies related to one level pulse-duration modulation are obviated.

Another embodiment of the invention, wherein the modulation circuit is adapted to carry out said pulse-duration modulation by controlling a leading edge of the level occurring first in time, and by controlling a trailing edge of the level occurring last in time, has the advantage that the switching over in the selection system of the picture display device, occurring between the pulses of the drive signal and accompanied by a given settling period, will introduce a (small) error in the high luminance portions of the video signal, and will not affect the sensitive dark portions.

In an advantageous embodiment of the invention the modulation circuit is adapted to effect the pulse-duration modulation of the level having a highest amplitude by a most significant part of the first modulation signal, and to effect the pulse-duration modulation of the level having a lowest amplitude by a least significant part of the first modulation signal. As an example, the first modulation signal is separated in a most significant part (for instance, the most significant bits) and a least significant part (for instance, the remaining least significant bits) to control the pulse-duration modulation of two levels.

In another embodiment of the invention the modulation circuit is adapted to carry out the pulse-duration modulation on a pulse with a predetermined waveform, and the pulse-height modulation by controlling the amplitude of the waveform. As an example, the modulation circuit modulates the pulse-duration of a pulse with a predetermined shape (as an example with the shape of a descending logarithmic function) in dependence on the applied video signal. The amplitude of the pulse shape, i.e. the pulse-height is modulated in dependence on the uniformity correction signal. This embodiment offers the advantage that any desired non-linear correction (like gamma correction) on the drive signals can easily be implemented. As an added advantage fewer bits may be required.

An embodiment of the invention, wherein the electron emitting sources are constituted by a line cathode which is coupled to a pulsatory supply source for driving the line cathode during line retrace periods, has the advantage that the non-uniformity caused by the voltage drop across the line cathode is obviated by driving the line cathode during a period in which no luminance information has to be displayed. Although this measure can be used advantageously independently of the pulse-duration modulation of the drive signals in dependence upon an applied video signal and a uniformity correction signal, a particular advantage is achieved in the combination by lowering the amount of uniformity correction needed.

These and other aspects of the invention will be apparent from and elucidated with reference to the embodiments described hereinafter.

BRIEF DESCRIPTION OF THE DRAWING

In the drawing:

FIG. 3 is a block diagram of an embodiment of a display device according to the invention, FIGS. 4A and B show embodiments of the drive of an electron source arrangement.

DESCRIPTION OF THE PREFERRED EMBODIMENTS

Figure 1A:
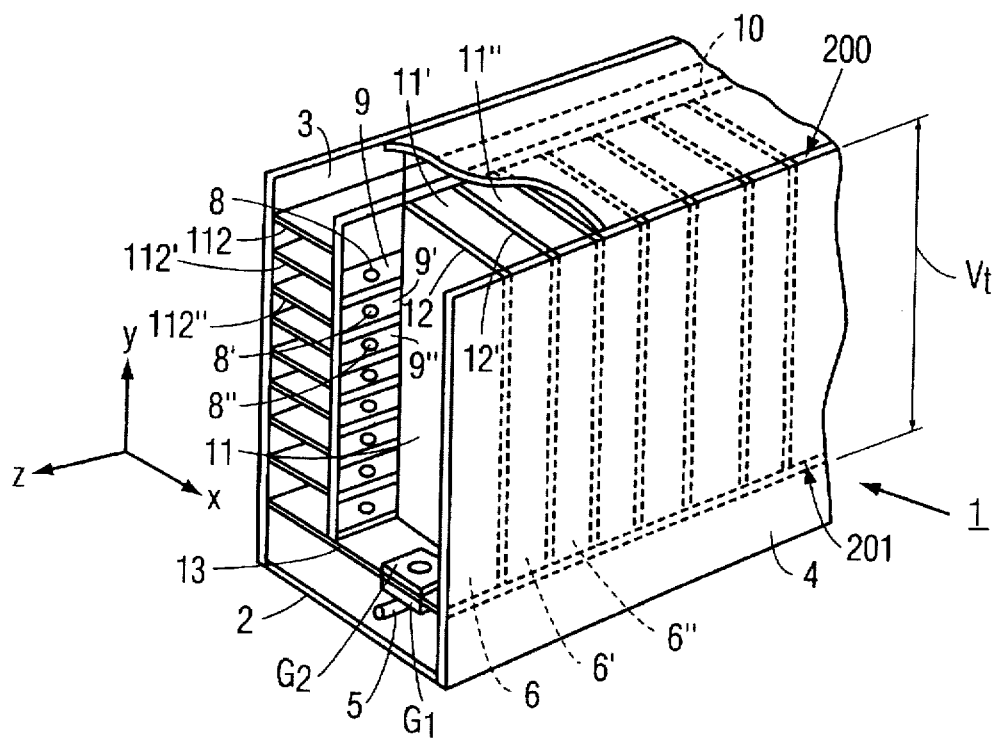
FIG. 1A is a diagrammatic perspective elevational view, partly broken away, of a display unit as can be used in a display device according to the invention.
Figure 1B:
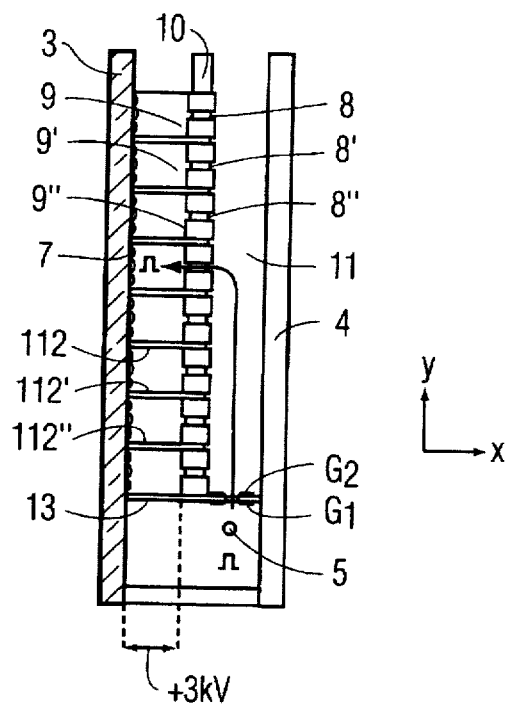
FIG. 1B is a cross-section through the display unit of FIG. 1A.

FIGS. 1A and 1B show a given type of flat-panel display unit 1 of a picture display device having a display panel (window) 3 and a rear wall 4 located opposite said panel. A luminescent screen 7 having a repetitive pattern (rows or dots) of, for example triplets of red (R), green (G) and blue (B) luminescing phosphor elements (or monochrome elements) is arranged on the inner surface of window 3. To be able to supply the required high voltage, the luminescent screen 7 is either arranged on a transparent, electrically conducting layer (for example, indium-tin oxide) or is provided with an electrically conducting layer (for example, AL backing). In a preferred embodiment the (dot-shaped) phosphor elements of a triplet are located at the vertices of a substantially isosceles/equilateral triangle.

An electron source arrangement 5, for example a line cathode which by means of drive electrodes provides a large number (for example, 600) of electron emitters or a similar number of separate emitters, is arranged proximate to a bottom plate 2 which interconnects display panel 3 and rear wall 4. Each of these emitters is to provide a relatively small current so that many types of cathodes (cold or hot cathodes) are suitable as emitters. Each emitter may be arranged separately or, if they are combined to one line cathode, they may be arranged jointly. They may have a constant or controllable emission. The electron source arrangement 5 is arranged opposite entrance apertures of a row of electron transport ducts extending substantially parallel to the screen, which ducts are constituted by compartments 6, 6', 6", . . . , etc., in this case one compartment for each electron source.

These compartments have cavities 11, 11', 11",  .... defined by the rear wall 4 and partitions 12, 12', 12", ..... At least one wall (preferably the rear wall) of each compartment is made of a material which has a suitable high electrical resistance in the longitudinal direction of the compartments for realising electron transport (for example, ceramic material, glass, synthetic material—coated or uncoated —) and which have a secondary emission coefficient δ>1 over a given range of primary electron energies. It is alternatively possible to construct (for example, the rear wall) from "isles" insulated from each other (in the longitudinal direction of the compartments) so as to obtain the desired high electrical resistance in the transport direction.

The electrical resistance of the wall material has such a value in the transport direction that a minimum possible total amount of current (preferably less than, for example 10 mA) will flow in the walls in the case of a field strength in the axial direction in the compartments of the order of one hundred to several hundred Volts per cm required for the electron transport. A voltage Vt which generates the field strength required for the transport is present in operation between an upper rim 200 and a lower rim 201 of the rear wall 4. By applying a voltage of the order of several dozen to several hundred Volts (value of the voltage is dependent on circumstances) between the row 5 of the electron sources and grids G1, G2 arranged at inputs of the compartments 6, 6', 6", . . . . , electrons are accelerated from the electron sources towards the compartments, whereafter they impinge upon the walls in the compartments and generate secondary electrons. The electrons can be withdrawn, for example, row by row from the compartments via apertures 8, 8', . . . in a selection plate 10 energized by means of electrodes 9, 9', . . . , (see FIG. 1A), and accelerated towards the luminescent screen 7 by means of an acceleration voltage applied in operation between the selection plate and the luminescent screen. Horizontal partitions 112, 112', 112", . . . are arranged between the display panel 3 and the selection plate 10. Instead of the partitions shown, it is alternatively possible to use apertured plates.

In this case the invention utilizes the aspect disclosed in European Patent Applications EP-A-400 750 and EP-A-436 997 that vacuum electron transport within compartments having walls of electrically insulating material is possible if an electric field ($E_y$) of sufficient power is applied in the longitudinal direction of the compartment. The contents of European Patent Applications EP-A-400 750 and EP-A-436 997 or U.S. Patents corresponding thereto are herein incorporated by reference.

FIGS. 1A and 1B show the principle of a display unit operating with single selection (as described hereinbefore).

Figure 2A:
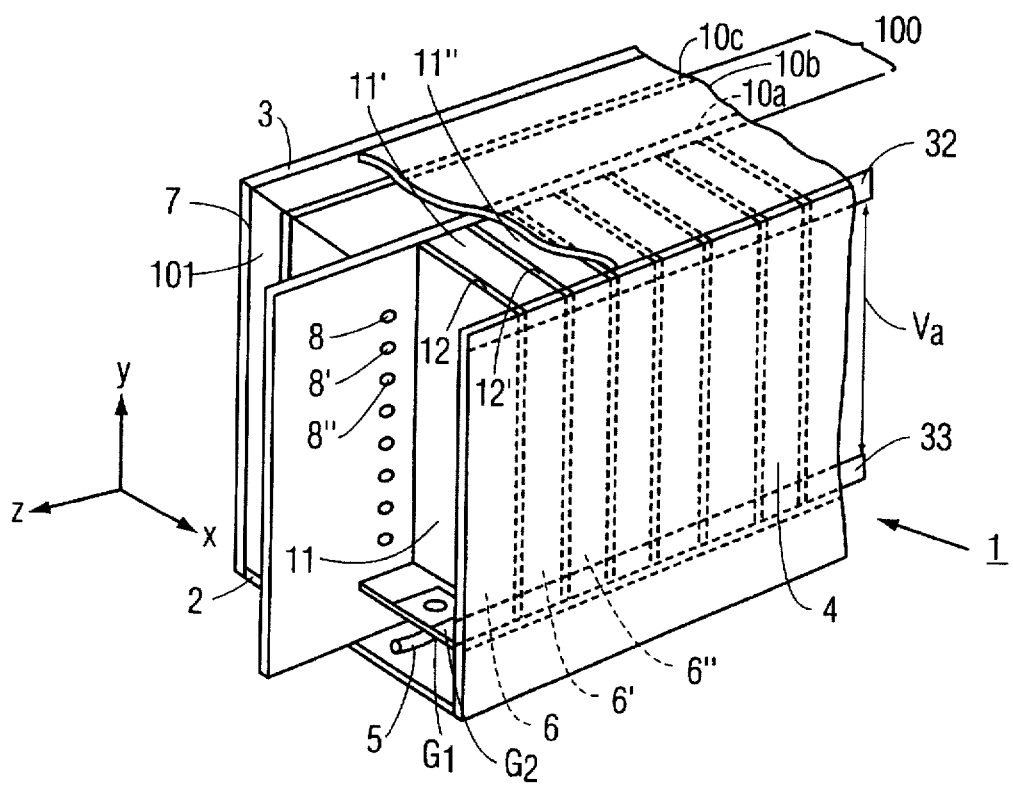
FIG. 2A is a diagrammatic perspective elevational view, partly broken away, of a display unit as can also be used in the display device, which display unit has a preselection and a fine selection.
Figure 2B:
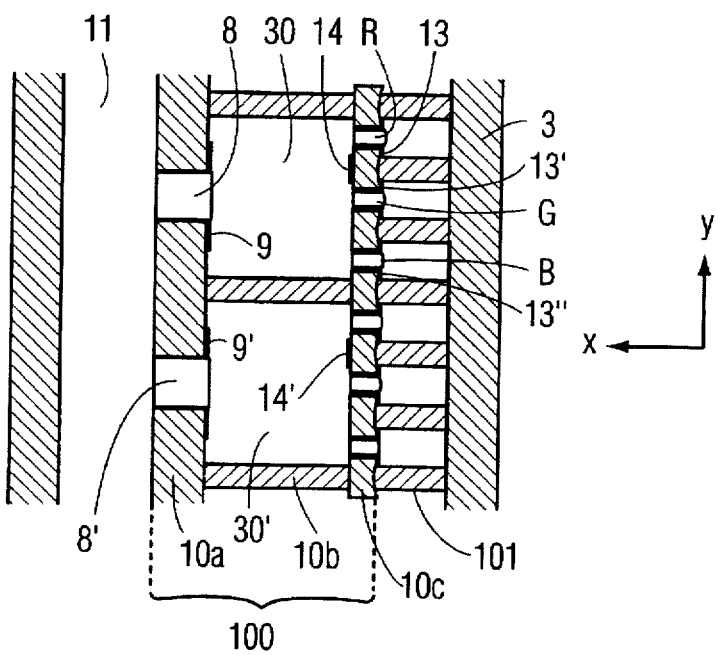
FIG. 2B is a cross-section through the display unit of FIG. 2A.

FIGS. 2A and 2B show the principle of stepped selection. Stepped selection is herein understood to mean that the selection from the compartments 6, 6', 6", . . . to the luminescent screen 7 is realised in at least two steps: a first (coarse) step for selecting, for example, the pixels and a second (fine) step for selecting, for example the colour pixels. The space between the compartments and the luminescent screen 7, which is arranged on the inner wall of display panel 3, accommodates an active colour selection system 100 which comprises an (active) preselection plate 10a, a spacer plate 10b and an (active) (fine-)selection plate 10c. Structure 100 is separated from the luminescent screen 7 by a flu-spacer structure 101, for example an apertured electrically insulating plate.

FIG. 2B shows in a diagrammatical cross-section a part of the display device of FIG. 2A in greater detail, particularly the active colour selection plate structure 100 which comprises a preselection plate 10a with extraction apertures 8, 8', 8", . . . and a fine-selection plate 10c with groups of apertures R, G, B. The apertures R, G, B are generally positioned in a triangle, but for the sake of clarity all three of them have been shown in the cross-section in FIG. 2B. Each extraction aperture 8, 8', etc. is associated with three fine-selection apertures R, G, B in this case. Other numbers are alternatively possible, for example 6 fine-selection apertures for each preselection aperture, etc. An intermediate spacer structure 10b is arranged between the preselection plate 10a and the fine-selection plate 10c. This structure accommodates communication ducts 30, 30', 30", . . . having a cross-section which is chosen to suit the shape of the phosphor colour pixels (for example, circular or triangular triplets).

The electron transport ducts 6, 6', 6", . . . are formed between the structure 100 and the rear wall 4. To be able to extract the electrons from the transport ducts 6, 6', 6", . . . via the apertures 8, 8', 8", . . . , pierced metal preselection electrodes 9, 9', 9", . . . are arranged on the screen-sided surface of the plate 10a.

The walls of the apertures 8, 8', . . . are preferably metallized completely or partly, but there is preferably no or little electrode metal on the surface of plate 10a on the side where the electrons land. This is done to ensure that no electrons remain on a selection electrode during addressing (i.e. the electrode must draw a minimum current).

Another solution to the problem of drawing current is to ensure that there is electrode metal on the selection surface where the electrons land, but this metal should be given such a large secondary emission coefficient that the preselection electrodes do not draw any net current.

Similarly as the plate 10a, the screen-sided surface of the apertured fine-selection plate 10c is provided with (fine-) selection electrodes 13, 13', . . . for realising, for example colour selection. Here again the apertures are preferably metallized completely or partly. The possibility of electrically interconnecting fine-selection electrodes is important in this respect. In fact, a preselection for each pixel has already taken place and, in principle, electrons cannot land at the wrong location (on the wrong pixel in this example). This means that, in principle, only one group or a small number of groups of three separate fine-selection electrodes is required for this form of fine selection. For example, the drive is effected as follows, but there are also other possibilities. The preselection electrodes are brought to a potential substantially linearly increasing with the distance to the electron source arrangement 5, for example, by means of a suitable resistance ladder.

One or more picture lines are selected by applying a positive voltage pulse of, for example, 200 V to the desired preselection electrodes used for selecting these picture lines. Colour pixels are addressed by applying shorter pulses having an amplitude of, for example 300 V to the fine-selection electrodes. The fine-selection electrodes preferably have such an electrical resistance, or are connected to external resisters in such a way that they safeguard the electronic circuits (controlling the drive) against breakdown from the luminescent screen.

FIG. 3 shows a display device W in which the invention can be used. The display device receives an input video signal Vin at an input 61. The input video signal Vin is applied to a video signal processing circuit 65. The display device receives a synchronizing signal sync at an input 62. The input 62 is connected to a synchronization processing circuit 63. This synchronization processing circuit supplies synchronizing signals to a clock generator 613 and defines the television standard of the incoming video signal. The incoming video signal may comprise, for example Y, U, V signals (or R, G, B signals). If the incoming video signal comprises Y, U, V signals, a conversion to R, G, B signals will have to take place in the video signal processing circuit 65 so that ultimately the different phosphors (red, green and blue) can be driven on the display panel 3. This conversion of Y, U, V signals to R, G, B signals may be effected by means of a matrix circuit. It is possible to carry out this conversion before the video signal is written into the memory MEM, or during the processing operation in the video signal processing circuit 65, or after the video signal processing circuit 65. The video signal is stored, for example, line-sequentially in the video signal processing circuit 65 under the control of a write clock which is generated, for example, by the clock generator 613. The video signal is supplied line by line (for example, for each colour line (R, G, B) in the case of a colour display screen) at an output of the video signal processing circuit under the control of a read clock generated by a clock generator 614 and is applied to the video drive circuit 34. In this video drive circuit the video information of, for example a (colour) line is written under the control of the clock generator 614 and subsequently applied in parallel to the G1 (or G2) electrodes which are arranged at the inputs of the compartments 6, 6', 6", . . . (see FIG. 1) of the display unit 1, after which the video information is displayed on the display panel 3. The lines and pixels are selected by means of a selection driver 611. The driver is controlled by a clock signal from clock generator 614. After each clock pulse the drive circuit D1 applies new drive voltages to the selection electrodes 9, 9', 9" . . . under the control of the selection driver 611 (see also FIG. 1A). The selection driver receives the information about the drive voltages, for example, from a look-up table or from an EPROM. The display unit 1 has a structure as described hereinbefore (see FIG. 1A).

The synchronization processing circuit 63 defines the line frequency, the field frequency and if the display device is suitable for displaying video signals of different TV standards and/or different aspect ratios, for example also the TV standard and the aspect ratio with reference to the incoming video signal.

The video signal processing circuit 65 stores the incoming video signal, for example, line-sequentially in a memory MEM, being part of the video signal processing circuit, under the control of a control section PROC. The control section receives information (if necessary) about the relevant TV standard and the aspect ratio from the synchronization processing circuit. The control section further receives the write clock and the read clock for writing and reading the video signal, respectively, from the clock generators 613 and 614. The control section may also ensure conversion to the double field frequency.

If the number of incoming video lines stored in the memory does not correspond to the number of display lines associated with the display unit, the video signal processing circuit is to ensure a line and pixel distribution associated with the display unit. The incoming video signal having n lines (dependent on the standard) must be converted by the video signal processing circuit into a video signal having m lines (the number of lines of the display panel 3). There are two possibilities, namely either n>m or n<m (at n=m the video signal does not need to be converted).

The video signal may be written into the memory MEM in the form of R, G and B signals. After processing under the control of the control section PROC, the video signal is read out, for example, in the form of R, G, B signals again.

FIGS. 4A and 4B show examples of driving the line cathode k(5) and thereby keeping it at the desired temperature. Since the line cathode has a resistance, there will be a voltage drop across the line cathode if a voltage or a current is presented to it. The resistance of the line cathode is necessary to heat the line cathode, but this will cause a difference in the number of electrons emitted by the line cathode in the different ducts. To prevent this, the choice may be made to present a voltage across or a current into the line cathode during the line retrace periods only. In FIG. 4A this is realised by applying the line retrace pulses which are used for generating the high voltage to the line cathode k via a transformer Tr and a diode D. The diode ensures that the voltage is present across the line cathode during the retrace pulse only. FIG. 4B shows an example in which the same effect is achieved by presenting a voltage to the line cathode during the line retrace periods only, starting from a DC source V which is connected to the line cathode via a switch S. The switch S is controlled by a pulse generator P (for example, coupled to the line retrace pulse). In an alternative solution the line cathode may be driven continuously and the voltage drop can be corrected by means of the G1 electrode drive provided by the video drive circuit 34.

In an embodiment of a display device according to the invention use is made of a thermal filament in an inverted triode configuration: the drive electrodes are "behind" the filament. The required drive voltage is of the order of 10 Vtt, the capacitance is determined by the supply filaments or tracks (for chip on glass of the order of 10 pF) and the leakage currents are very low.

In the drive of this display device there are a number of essential differences from a cathode ray tube (CRT) drive. In a CRT the three colours are parallel emitted and the pixels (on one line) are sequentially emitted. This involves three subsystems which must operate at very high frequencies and at which mutual differences lead to an error in the colour balance. In an embodiment of a display device according to the invention a large number of columns is driven in parallel and the colours are driven sequentially. The parallelism implies that the emission frequencies are relatively low, and since each gun drives all three colours, emission errors do not lead to errors in the colour balance. The mutual equality of the sources is, however, essential because this corresponds to a column-to-column uniformity to which the eye is very sensitive. Another result of this system is that differences between the colours correspond to a larger dynamic range of the emission. In a number of cases this could easily be compensated in a modulation system as described hereinafter with reference to FIG. 5, but it is probably simpler to start from the least efficient colour and to adapt the two other phosphors thereto. Extreme differences are not foreseen at the moment. There are some important causes for column-to-column non-uniformity.

As described above a voltage drop across the filament results in a uniformity error. This can be corrected by means of a feed forward control or prevented by pulsatory heating of the filament in the non-emissive period. Moreover, a variation of emissive properties of the filament surface (temperature, electron emission potential and contamination) leads to errors. Under normal vacuum circumstances the emission will be completely space charge-limited, hence independent of the filament surface.

A variation of the filament geometry initially does not have any influence on the uniformity, but the distance between the filament and the electrodes does. Finally, a variation of the efficiency of the filament influences the uniformity.

In addition to this column-to-column (non-)uniformity, the line-to-line uniformity should also be ensured/corrected. Particularly for a filament at half the height of the display, the lines in the middle will have to be corrected.

In order to correct the above-mentioned uniformity errors, the video signal can be corrected with a correction factor in a multiplier circuit without having to extend the normal dynamic range of the video signal. It does not matter whether the correction is realised in pulse height or pulse width. In principle, a distinction can be made between:

1. no correction, 2. correction in accordance with a fixed setting realised by the manufacturer, 3. correction in accordance with a control realised by the manufacturer, 4. correction in an intermittent feedback, for example when the display device is switched on, or during the field retrace period, 5. correction in a direct feedback per column.

A memory element, for example the capacitor of an analog gated integrator, or a digital memory is essential for items 2, 3 and 4. For item 4, it is sufficient to use a single detector for all columns combined: during the measuring cycle only one column is switched on and detected and fed back at a common measuring electrode. For item 5 a measuring electrode per column is required, which doubles the number of contacts and necessitates a separate detection circuit per column. With such detector means, a test signal applied preferably during the field retrace time to the video drive circuit 34 and transported by the transport ducts 6, 6', 6", ... can be measured for obtaining an efficient uniformity control. Advantageous use is made of the detector 600 (see FIG. 3) as further described in European Patent Applications EP-A 0 400 750 and 92204007.6 (PHN 13.963 corresponding to U.S. patent application Ser. No. 08/373,917 filed on 17 Jan. 1995), or corresponding U.S. Patents whose contents are herein incorporated by reference. During the field retrace time, a test signal is applied to the video input of the video drive circuit 34, for example during a number of line trace periods. In this embodiment the detector is arranged above the display unit 1 and comprises a measuring element per compartment 6, 6', 6", . . . which measures the number of electrons -arriving at the top of the relevant compartment. The detector compares the measurements of all measuring elements (for example, with a reference signal) and supplies a signal so as to compensate this difference. The detector thus detects a possible difference between the different channels, which difference can be either corrected in the video drive circuit 34 itself or fed back to the video signal processing circuit 65, PROC in which the required correction is then performed together with the different operations.

Dependent on the errors made and/or with reference to the desired resolution/accuracy it is possible to make a choice between the different uniformity correction methods mentioned under items 1 to 5.

To display the incoming video signal on the display screen, the number of electrons which are sent into the ducts by the grid G1 (G2) must be modulated. This can be done in accordance with a number of different methods as shown in FIGS. 5A to 5E.

FIG. 5 shows the signals for 6 different intensities (9/16, 1/16, 2/16, 4/16, 8/16 and 16/16).

Figure 5A:
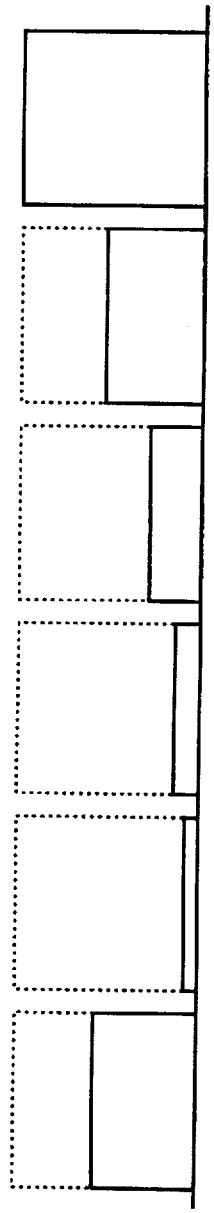
FIGS. 5A–E shows different modulation methods for modulating the grids with video information.

FIG. 5A shows voltages which occur in an embodiment of a video drive circuit 34 when using pulse height modulation. The required pulse repetition frequency is reasonably low (<<1 MHz). The pulse height can be fixed both in an analog and a digital manner, but in both cases it is not trivial to ensure the required mutual equality between the columns. In the analog system crosstalk and variations in offset and gain are a problem, and the digital system requires a DAC per column. When using pulse height modulation, a column-to-column uniformity of the guns is required throughout the dynamic range.

Figure 5B:
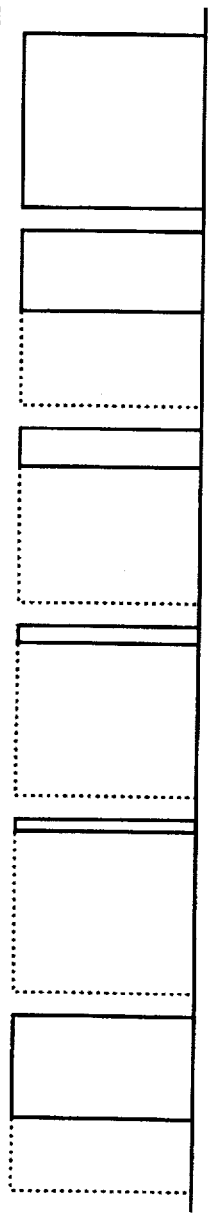

FIG. 5B shows voltages which occur in an embodiment of a video drive circuit 34 when using pulse width modulation. This signal results in a gamma of 1.00. The output stage is very simple and accurate (for example, a switch) and can also be fairly easily extended by means of a uniformity correction: it is necessary to correct only one level (i.e. the gain) and the system is further linear by nature. The gain can be performed as a multiplication factor on the linear video signal or as a correction of the amplitude. In the latter case the correction is by nature correct throughout the range: the amplitude is adapted until the effective emission of all sources is the same and the video signal is "independent"-modulated thereon in pulse width and is thus linear.

The pulse width can be simply generated in an analog or a digital form. A drawback of the gamma=1.00 is that, since our perception has a logarithmic character, very small grey scales are necessary in the dark portion. Analog processing then already soon involves extra noise in dark portions, while also crosstalk may occur due to all switching neighbouring signals. Digitally generated signals result in a very great accuracy, but then very high frequencies are used: 100 Hz HDTV with colour and column multiplexing involves a pulse period of approximately 2.5 microseconds, i.e. 100 MHz resolution for a small number of grey scales of 256. As is shown in FIG. 5B, the leading edge of the pulse is modulated instead of the customary trailing edge. This has the advantage that, since the selection system switches over between the pulses and is accompanied by a given settling period, a (relatively) small error is obtained for a signal having a large intensity as a result of a selection which is still insufficiently stabilized, while the other intensities are not noticeably influenced. However, if the trailing edge is modulated, the dark portions are relatively strongly influenced by a selection which is not yet stabilized. For all switched display screens, leading edge modulation thus yields ampler time margins than trailing edge modulation.

Figure 5C:
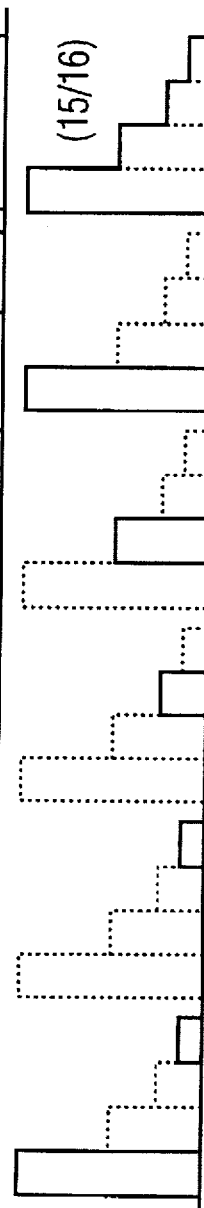

FIG. 5C shows voltages which occur in an embodiment of a video drive circuit 34 when using a first mixed form of pulse height and pulse width modulation. Here, the separate bits of the intensity signal are separately emitted with respect to time. Now, a plurality of individual pulses may be consecutively produced, as is shown for the first period of relative intensity 9/16. In this embodiment the output stage reduces to a single switch per column and the height of the consecutive bit levels can be controlled centrally. The frequencies are not too high. A problem of this embodiment is that separate bit levels should correspond accurately to the associated emission levels, i.e. they should not correspond to the voltage levels. In fact, the signals are added together as emission with respect to time. This means that all bit levels must be adjusted to the gamma characteristic of the guns and that non-uniformity of the guns cannot be corrected without losing the advantage of the central bit level control. The pulse-height of the separate pulses may also be chosen in an ascending order.

Figure 5D:
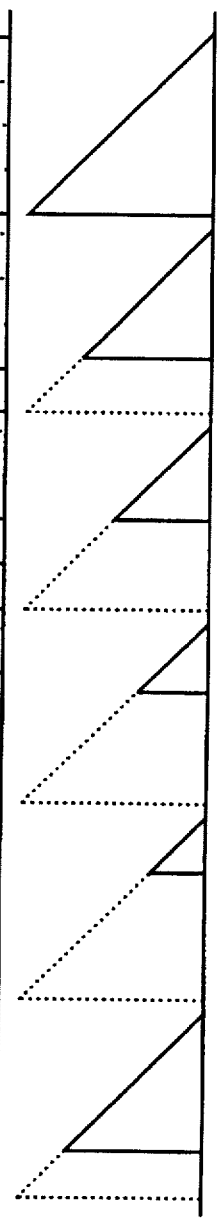

FIG. 5D shows voltages which occur in an embodiment of a video drive circuit 34 when using a modulation in which the pulse width signal is modulated with a descending pulse height. The result is that the effective gamma of the pulse width signal will be much larger than 1 (here, for example 2 when it is assumed that the cathode reacts linearly proportionally). Consequently, smaller grey scales in the dark portions are automatically obtained, which for an analog circuit yields less noise and for a digital circuit yields fewer required bits and hence a lower frequency. A drawback is that a possible lack of uniformity throughout the pulse height characteristic results in errors. Otherwise, the drivers themselves may have a very good uniformity because the pulse height sweep can be generated centrally so that the output stages have the character of a switch again. Any desired gamma or other non-linearity correction can be set in a very simple manner by means of the centrally generated pulse height sweep. Non-uniformity of the guns directly leads to large errors. The pulse height sweep waveform can be chosen to fit with the desired non-linearity correction, and need not be a straight line. In case of an ascending waveform the pulse-duration modulation can be performed on the trailing edge.

Figure 5E:
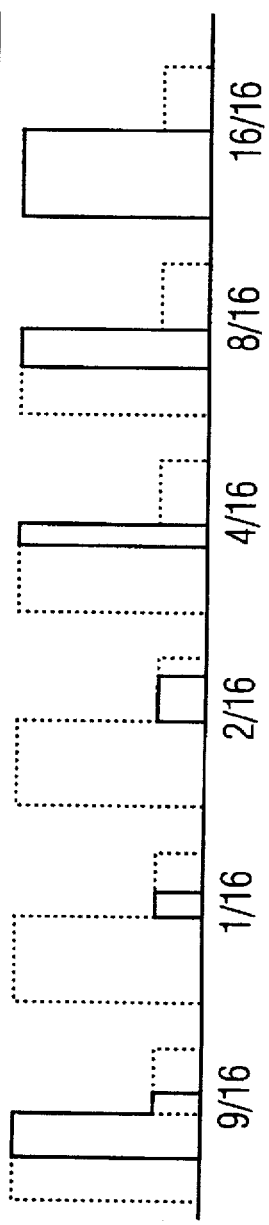

FIG. 5E shows voltages which occur in an embodiment of a video drive circuit 34 when using another mixed form of pulse height and pulse width modulation. Here, the drawback of the high digital frequencies of the pure pulse width modulation of FIG. 5B is obviated by dividing the signal into two parts. First, the most significant part of the signal is emitted in pulse width. Then, the least significant bits are emitted in pulse width at a much lower pulse height. This leads to a leading edge modulation having a large pulse height for coarse control and a trailing edge modulation having a low pulse height for the fine control. An example thereof is a total of 9 bits accuracy, divided into 6 MSB and 3 LSB. A total pulse duration of a maximum number of 64 time steps is then obtained in the coarse part, plus 8 time steps in the fine part at an emission level of ⅛ of the coarse part. This yields a total of 72 time steps, i.e. acceptable frequencies, and still a 9-bit resolution. The output stage still has the level of a single switch. It is a problem again to control the LSB pulse height at (for example) ⅛ of the emission level of the MSB pulse height, but as far as accuracy and complexity are concerned this is much less demanding than the modification described hereinbefore with reference to FIG. 5C. In other words, small differences between the guns themselves can probably be compensated for. It is also possible to first emit the low pulse height in pulse-width and then the high pulse height in pulse width.

A choice can be made from the following preferred methods.

No uniformity correction necessary: embodiments shown in FIG. 5D or possibly 5E. FIG. 5D shows a freely adjustable gamma correction, which may have its advantages for the previous video processing operation (number of bits). FIG. 5E provides additional possibilities for a high grey scale resolution at acceptable frequencies, but is slightly more critical in matching the MSB and LSB emission levels. In FIG. 5D this is not very critical to the eye, because there are no discontinuities in the transmission.

Only gain correction necessary: this is always possible and simple, particularly in the linear systems, see FIGS. 5B or 5E. In principle, it is possible to choose pulse width correction (video signal) or pulse height correction.

Large differences in gun characteristics: see FIGS. 5B or 5E. In FIG. 5B it is possible to choose between pulse width correction (video signal) or pulse height correction of each column. In FIG. 5E both emission levels should be controlled per column.

Generally, video signals are transmitted and processed colour-parallel and pixel-sequentially. This means that a series-parallel conversion has to be performed somewhere in the system. The obvious choices are analog versus digital and shift register versus bus distribution. Bus distribution requires fewer components but imposes strict requirements on the fan-out of the bus drivers. Shift registers in analog form may yield a cumulative error. An analog form may be a CCD register (charge transport) or a sample-and-hold register (voltage transport).

A related point is the information current density, when, for example 100 Hz HDTV is applied. In the traditional serial structure, very high frequencies are associated therewith. A possibility of decreasing the frequency is the use of two or more parallel processors, for example one for the left-hand part and one for the right-hand part, while the number of processors is reduced in display screens on which less stringent requirements are imposed, so that this will have a cost-decreasing effect.

We claim:

1. A picture display device comprising a video drive circuit for generating drive signals for driving a display unit, said display unit comprising a plurality of juxtaposed sources for emitting electrons, and a plurality of electron transport ducts cooperating with the sources for transporting the electrons, wherein the video drive circuit comprises a modulation circuit adapted to carry out a pulse-duration modulation of the drive signals and a pulse-height modulation of the drive signals in dependence upon respective first and second modulation signals, for controlling the supply of electrons from the sources to the electron transport ducts, and wherein said modulation signals comprise an applied video signal and a uniformity correction signal.

2. A picture display device as claimed in claim 1, wherein the modulation circuit is adapted to multiply the first modulation signal with the second modulation signal.

3. A picture display device as claimed in claims 1 or 2, wherein the modulation circuit is adapted to carry out the pulse-duration modulation of the drive signals by controlling a leading edge.

4. A picture display device as claimed in claims 1 or 2, wherein the modulation circuit is adapted to generate at least two different pulse-height levels, each of the levels being pulse-duration modulated.

5. A picture display device as claimed in claim 4, wherein the modulation circuit is adapted to carry out said pulse-duration modulation by controlling a leading edge of the level occurring first in time, and by controlling a trailing edge of the level occurring last in time.

6. A picture display device as claimed in claim 4, wherein the modulation circuit is adapted to effect the pulse-duration modulation of the level having a highest amplitude by a most significant part of the first modulation signal, and to effect the pulse-duration modulation of the level having a lowest amplitude by a least significant part of the first modulation signal.

7. A picture display device as claimed in claims 1 or 2, wherein the modulation circuit is adapted to carry out the pulse-duration modulation on a pulse with a predetermined waveform, and the pulse-height modulation by controlling the amplitude of the waveform.

8. A picture display device as claimed in claim 1, wherein the electron emitting sources comprise a line cathode which is coupled to a pulsatory supply source for driving the line cathode during line retrace periods.

9. A picture display device as claimed in claim 8, wherein the pulsatory supply source comprises a DC-source and a controlled switch being controlled by a pulse generator receiving a line-frequency signal.

10. A picture display device as claimed in claim 8, wherein the pulsatory supply source comprises a transformer, which receives a line-frequency signal across a primary winding, and while a diode in series with the line cathode is coupled across a secondary winding.

* * * * *